United States Patent
Kubota

(10) Patent No.: US 12,312,497 B2
(45) Date of Patent: May 27, 2025

(54) COATING LIQUID, MANUFACTURING METHOD OF COMPOSITE PARTICLE, AND MANUFACTURING METHOD OF ALL SOLID STATE BATTERY

(71) Applicant: TOYOTA JIDOSHA KABUSHIKI KAISHA, Toyota (JP)

(72) Inventor: Masaru Kubota, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 18/103,065

(22) Filed: Jan. 30, 2023

(65) Prior Publication Data

US 2023/0303864 A1  Sep. 28, 2023

(30) Foreign Application Priority Data

Mar. 25, 2022 (JP) .................. 2022-049685

(51) Int. Cl.

| | |
|---|---|
| C09D 1/00 | (2006.01) |
| C01G 53/50 | (2025.01) |
| C09D 5/24 | (2006.01) |
| H01M 4/36 | (2006.01) |
| H01M 4/505 | (2010.01) |
| H01M 4/525 | (2010.01) |
| H01M 4/62 | (2006.01) |
| H01M 10/0562 | (2010.01) |
| H01M 10/0585 | (2010.01) |
| H01M 4/02 | (2006.01) |

(52) U.S. Cl.
CPC .............. *C09D 5/24* (2013.01); *C01G 53/50* (2013.01); *C09D 1/00* (2013.01); *H01M 4/366* (2013.01); *H01M 4/505* (2013.01); *H01M 4/525* (2013.01); *H01M 4/62* (2013.01); *H01M 10/0562* (2013.01); *H01M 10/0585* (2013.01); *C01P 2004/80* (2013.01); *C01P 2006/40* (2013.01); *H01M 2004/028* (2013.01); *H01M 2300/0068* (2013.01)

(58) Field of Classification Search
CPC .......... C09D 5/24; C09D 1/00; H01M 4/366; H01M 4/505; H01M 4/62; H01M 10/0562; H01M 10/0585; H01M 2004/028; H01M 2300/0068; C01P 2004/80; C01P 2006/40
USPC ..................................... 106/287.29
See application file for complete search history.

(56) References Cited

U.S. PATENT DOCUMENTS

| | | |
|---|---|---|
| 2015/0017536 A1 | 1/2015 | Abe et al. |
| 2022/0085347 A1 | 3/2022 | Kubota et al. |
| 2022/0223860 A1 | 7/2022 | Ahn et al. |

FOREIGN PATENT DOCUMENTS

| | | | |
|---|---|---|---|
| JP | H08227669 A | * | 9/1996 |
| JP | 2003-338321 A | | 11/2003 |
| JP | 2019-050083 A | | 3/2019 |
| JP | 2021-048037 A | | 3/2021 |
| JP | 2022-047501 A | | 3/2022 |

(Continued)

OTHER PUBLICATIONS

U.S. Appl. No. 17/945,642, filed Sep. 15, 2022; Masaru Kubota, et al.

*Primary Examiner* — James E McDonough
(74) *Attorney, Agent, or Firm* — Dinsmore & Shohl LLP

(57) ABSTRACT

The coating liquid includes a solute and a solvent. The solute comprises a phosphoric acid compound and a lithium compound. The coating liquid has a pH of 2.5 to 10.7.

6 Claims, 2 Drawing Sheets

(56) References Cited

FOREIGN PATENT DOCUMENTS

| JP | 2022-530839 | A | 7/2022 |
|----|-------------|-----|--------|
| WO | 2013/132663 | A1 | 9/2013 |
| WO | 2021/029534 | A1 | 2/2021 |

* cited by examiner

COATING LIQUID, MANUFACTURING METHOD OF COMPOSITE PARTICLE, AND MANUFACTURING METHOD OF ALL SOLID STATE BATTERY

CROSS-REFERENCE TO RELATED APPLICATION

This application claims priority to Japanese Patent Application No. 2022-049685 filed on Mar. 25, 2022, incorporated herein by reference in its entirety.

BACKGROUND

1. Technical Field

The present disclosure relates to a coating liquid, a manufacturing method of a composite particle, and a manufacturing method of an all solid state battery.

2. Description of Related Art

Japanese Unexamined Patent Application Publication No. 2003-338321 (JP 2003-338321 A) discloses dissolving lithium nitrate and phosphoric acid in ethanol such that "LiNO$_3$/H$_3$PO$_4$=3/1", and spraying or dropping the solution onto a positive electrode active material to precipitate the solution.

SUMMARY

Sulfide-based all solid state batteries (hereinafter, may be abbreviated as "all solid state batteries") have been developed. The all solid state battery includes a sulfide solid electrolyte. When the sulfide solid electrolyte is in direct contact with a positive electrode active material particle, the sulfide solid electrolyte may deteriorate. Degradation of the sulfide solid electrolyte (ion conduction path) can increase battery resistance. Therefore, it has been proposed to form a coating film on a surface of the positive electrode active material particle. When the coating film inhibits direct contact between the positive electrode active material particle and the sulfide solid electrolyte, deterioration of the sulfide solid electrolyte can be reduced. This is expected to reduce the battery resistance.

Phosphoric acid compounds have been studied as raw materials for coating films. Coating treatment can be carried out, for example, in the following manner. That is, the lithium nitrate and the phosphoric acid are dissolved in the solvent to prepare the coating liquid. The coating liquid adheres to a surface of the positive electrode active material particle. The coating liquid adhered to a particle surface is dried to form the coating film.

An object of the present disclosure is to reduce battery resistance.

A technical configuration and effects of the present disclosure will be described below. However, an effect mechanism of the present specification includes speculation. The effect mechanism does not limit the technical scope of the present disclosure.

The coating liquid includes a solute and a solvent. The solute includes a phosphoric acid compound and a lithium compound. The coating liquid has a pH of 2.5 to 10.7.

Conventionally, coating liquids tend to exhibit strong acidity. This is probably because phosphate is used as the solute. Conventionally, the coating liquid may have a pH of less than 2.5.

According to the new knowledge of the present disclosure, there is an aspect in which a coating liquid exhibiting strong acidity damages the surface of the positive electrode active material particles, thereby increasing the battery resistance. Therefore, even if the direct contact between the positive electrode active material particle and the sulfide solid electrolyte is reduced by the coating film, there is a possibility that the battery resistance is not reduced.

The disclosed coating liquid has a pH of 2.5 or greater. Thus, a reduction in battery resistance is expected. However, when the pH exceeds 10.7, a precipitate of the phosphate acid compound is likely to be formed. Therefore, the pH is 2.5 to 10.7.

In the above coating liquid, a molar ratio of lithium with respect to phosphorus may be 0.45 to 1.09.

When the molar ratio "$n_{Li}/n_P$" of lithium (Li) to phosphorus (P) is 0.45 to 1.09, a phosphate skeleton tends to be maintained in the coating liquid and in the coating film. When the coating film contains the phosphate skeleton, the battery resistance is expected to be reduced.

In the coating liquid described above, the lithium compound may include, for example, lithium hydroxide.

When the coating liquid contains lithium hydroxide in addition to the phosphoric acid compound, the pH of the coating liquid tends to be high.

In the coating liquid, the phosphoric acid compound may include at least one selected from a group consisting of metaphosphoric acid and polyphosphoric acid, for example.

Metaphosphoric acid and polyphosphoric acid are phosphoric acid compounds. Metaphosphoric acid and polyphosphoric acid may have longer molecular chains than other phosphoric acid compounds. When the solute contains at least one of metaphosphoric acid and polyphosphoric acid, for example, it is expected that a coating film having continuity is easily formed. As a result, for example, an improvement in the coverage rate is expected.

A manufacturing method of a composite particle includes the following (a) and (b).
  (a) Preparing a mixture by mixing the coating liquid and a positive electrode active material particle.
  (b) Manufacturing the composite particle by drying the mixture.

In a manufacturing method of the composite particle described above, the positive electrode active material particle may have, for example, a chemical composition represented by the following formula (1).

$$LiNi_xM^1_{1-x}O_2 \qquad (1)$$

In the above formula (1), M$^1$ includes at least one selected from a group consisting of Co, Mn, and Al. x satisfies a relationship of 0.5≤x≤1.

In the above formula (1), a material in which x of 0.5 or more is also referred to as a high nickel material. The high nickel material may have high capacity and high output power. High nickel materials tend to be weak against acids. It is believed that the use of conventional coating liquids for high nickel materials tends to increase battery resistance. It is believed that the coating liquid described above is suitable for high nickel materials.

A manufacturing method of an all solid state battery includes the following (c) and (d).
  (c) Manufacturing a positive electrode including a composite particle manufactured by the manufacturing method, and a sulfide solid electrolyte.
  (d) Manufacturing the all solid state battery including the positive electrode.

In the above manufacturing method, a reduction in battery resistance is expected. This is because corrosion of the positive electrode active material particle by the coating liquid can be reduced, and direct contact between the positive electrode active material particle and the sulfide solid electrolyte can be reduced.

Hereinafter, embodiments of the present disclosure (hereinafter can be abbreviated as the "present embodiment") and examples of the present disclosure (hereinafter can be abbreviated as the "present example") will be described. However, the present embodiment and the present example do not limit the technical scope of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Definitions of Terms

Figure 1:
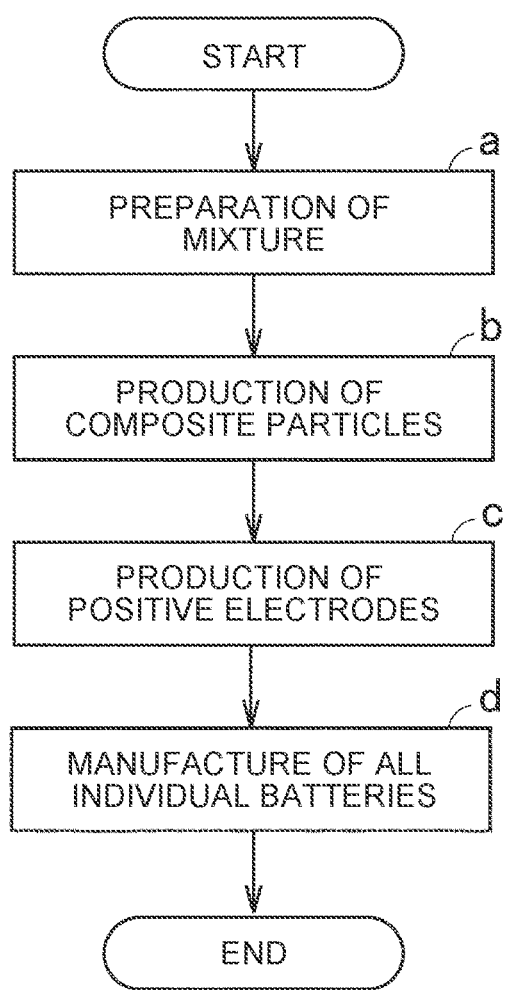
FIG. 1 is a schematic flowchart of a manufacturing method according to the present embodiment.

Statements of "comprising," "including," and "having," and variations thereof (for example "composed of") are open-ended format. The open-ended format may or may not include an additional element in addition to a required element. A statement of "consisting of" is a closed format. However, even when the statement is the closed format, normally associated impurities and additional elements irrelevant to the disclosed technique are not excluded. A statement "substantially consisting of" is a semi-closed format. The semi-closed format allows addition of an element that does not substantially affect the basic and novel characteristics of the disclosed technique.

Expressions such as "may" and "can" are used in the permissive sense of "having the possibility of" rather than in the obligatory sense of "must".

Elements expressed in the singular also include the plural unless specifically stated otherwise. For example, "particle" may mean not only "one particle" but also "an aggregate of particles (powder, powder, particle group)".

For multiple steps, actions, operations, and the like included in various methods, the execution order thereof is not limited to the described order unless otherwise specified. For example, the multiple steps may proceed concurrently. For example, the multiple steps may occur one after the other.

For example, numerical ranges such as "m % to n %" include upper and lower limit values unless otherwise specified. That is, "m % to n %" indicates a numerical range of "m % or more and n % or less". In addition, "m % or more and n % or less" includes "more than m % and less than n %". Further, a numerical value selected as appropriate from within the numerical range may be used as a new upper limit value or a new lower limit value. For example, a new numerical range may be set by appropriately combining numerical values within the numerical range with numerical values described in other parts of the present specification, tables, drawings, and the like.

All numerical values are modified by the term "approximately." The term "approximately" can mean, for example, ±5%, ±3%, ±1%, and the like. All numerical values can be approximations that may vary depending on the mode of use of the disclosed technique. All numerical values can be displayed with significant digits. A measured value can be an average value of multiple measurements. The number of measurements may be three or more, five or more, or ten or more. In general, it is expected that the reliability of the average value improves as the number of measurements increases. The measured value can be rounded by rounding based on the number of significant digits. The measured value can include errors and the like associated with, for example, the detection limit of a measuring device.

Geometric terms (for example, "parallel", "perpendicular", and "orthogonal") are not to be taken in a strict sense. For example, "parallel" may deviate somewhat from "parallel" in a strict sense. Geometric terms may include, for example, design, work, manufacturing tolerances, errors, etc. Dimensional relationships in each drawing may not match actual dimensional relationships. The dimensional relationships (length, width, thickness, etc.) in each drawing may be changed to facilitate understanding of the disclosed technique. Further, a part of the configuration may be omitted.

When a compound is represented by a stoichiometric compositional formula (e.g., "LiCoO$_2$"), the stoichiometric compositional formula is only representative of the compound. The compound may have a non-stoichiometric composition. For example, when lithium cobaltate is expressed as "LiCoO$_2$,", unless otherwise specified, lithium cobaltate is not limited to the composition ratio of "Li/Co/O=1/1/2" and may include Li, Co and O at any composition ratio. In addition, doping, substitution, etc. with trace elements may also be tolerated.

"D50" refers to the particle size that reaches 50% of the cumulative frequency from the smaller particle size in a volume-based particle size profile. D50 can be measured by laser-diffraction methods.

pH Measuring pH of the coating liquid is measured by a pH meter having a temperature-compensating function. For example, a desktop pH meter "F-71" (or equivalent) manufactured by Horiba Advanced Techno may be used. As pH electrode, for example, a GRT compound electrode "standard ToupH electrode" (or equivalent) manufactured by Horiba Advanced Techno Co., Ltd. may be used.

ICP Measuring

The molar ratio "$n_{Li}/n_P$" in the coating liquid is measured in the following manner. By diluting 0.01 g coating liquid with pure water, a 100 ml sample liquid is prepared. An aqueous solution of P, Li (1000 ppm, 10000 ppm) is prepared. The aqueous solution of 0.01 g is diluted with pure water to prepare a reference solution. Inductively Coupled Plasma Atomic Emission Spectroscopy (ICP-AES) A device is prepared. The emission intensity of the reference solution is measured by ICP-AES device. A calibration curve is prepared from the emission intensity of the standard solution. ICP-AES device measures the emission intensity of the sample liquid (diluent of the coating liquid). From the emission intensity of the sample solution and the calibration curve, the mass-concentration of P and Li in the coating liquid is determined. In addition, the weight concentration of P and Li is converted to molar concentration. By dividing the molar concentration of Li ($n_{Li}$) by the molar concentration of P ($n_P$), the molar ratio "$n_{Li}/n_P$" is obtained.

XPS Measuring

The coverage of the composites is determined by X-ray Photoelectron Spectroscopy (XPS). The measurement procedure is as follows. A XPS device is provided. For example, a XPS device "product-name PHIX-tool" (or equivalent) manufactured by ULVAC FIE may be used. A sample powder consisting of complex particulates is placed in a XPS device. The pass energy of 224 eV performs narrow scan analyses. The measurement data is processed by the analysis software. For example, an analysis software "MulTiPak" (or equivalent) manufactured by ULVAC FIRE may be used.

By the measured data is analyzed, from each peak area of C1s, O1s, P2p, M2p (or M2p$_{3/2}$), the ratio of each element (element concentration) is determined. The coverage ratio is determined by the following formula (2).

$$\theta = P/(P+M) \times 100 \quad (2)$$

In the above formula (2), $\theta$ represents a coverage ratio (%). P, M represents the ratio of each element.

"M2p (or M2p$_{3/2}$)" and M in the above formula (2) are constituent elements of the positive electrode active material grains, and represent elements other than Li and O. That is, the positive electrode active material particles may be represented by the following formula (3).

$$LiM^3O_2 \quad (3)$$

$M^3$ corresponds to "M2p (or M2p$_{3/2}$)" and M in the above equation (2). $M^3$ may be composed of one element or a plurality of elements. $M^3$ may be, for example, at least one selected from the group consisting of nickel (Ni), cobalt (Co), manganese (Mn), and aluminum (Al). When $M^3$ includes a plurality of elements, the sum of the compositional ratios of the respective elements may be 1.

For example, when the positive electrode active material grains are "LiNi$_{1/3}$Co$_{1/3}$Mn$_{1/3}$O$_2$", the above equation (2) can be transformed into the following equation (2').

$$\theta = P/(P+Ni+Co+Mn) \times 100 \quad (2')$$

Ni in the above equation (2') represents the elemental ratio of nickel determined from the peak area of Ni2p$_{3/2}$. Co represents the elemental proportion of cobalt determined from the peak area of Co2p$_{3/2}$. Mn represents the elemental proportion of manganese determined from the peak area of Mn2p$_{3/2}$.

Film Thickness Measurement

The film thickness (thickness of the coating film) can be measured by the following procedure. The sample is prepared by embedding the composite particles in a resin material. The sample is subjected to a cross-section forming process by an ion milling apparatus. For example, an ion milling device "Arblade 5000" (or equivalent) manufactured by Hitachi High-Technologies may be used. The cross-section of the sample is observed by SEM (Scanning Electron Microscope). For example, a SEM device "product-name SU8030" (or equivalent) manufactured by Hitachi High-Technologies may be used. For each of the ten composite particles, the film thickness is measured in 20 fields of view. The arithmetic average of the film thicknesses at a total of 200 positions is regarded as the film thickness.

Coating Liquid

The coating liquid is used to form a coating film on the surface of the positive electrode active material particles. The coating liquid includes a solute and a solvent.

The coating liquid has a pH of 2.5 to 10.7. When the coating liquid has a pH of 2.5 or more, the cell resistivity is expected to be reduced. The coating liquid may have, for example, a pH of 6 or more, a pH of 8 or more, or a pH of 8.6 or more. The coating liquid having a pH of 10.7 or less is expected to reduce the sediment. The coating liquid may have, for example, a pH of 8.6 or less, may have a pH of 8 or less, or may have a pH of 6 or less.

Solute

The solute amount may be, for example, 0.1 to 20 parts by mass, 1 to 15 parts by mass, or 5 to 10 parts by mass with respect to 100 parts by mass of the solvent.

The solute includes a phosphoric acid compound. The phosphoric acid compound may include, for example, at least one selected from the group consisting of phosphoric anhydride ($P_2O_5$), orthophosphoric acid, pyrophosphoric acid, metaphosphoric acid, and polyphosphoric acid. The phosphoric acid compound may include, for example, at least one selected from the group consisting of metaphosphoric acid and polyphosphoric acid. Metaphosphoric acid and polyphosphoric acid may have longer molecular chains than other phosphoric acid compounds. When the solute contains at least one of metaphosphoric acid and polyphosphoric acid, for example, it is expected that a coating film having continuity is easily formed. As a result, for example, an improvement in the coverage rate is expected.

The solute includes a lithium compound in addition to the phosphoric acid compound. The lithium compound may be basic, acidic, or neutral. For example, pH of the coating liquid may be adjusted according to the dissolution rate of the lithium compound. That is, the lithium-compound may function as a pH modifier. The lithium compound may include, for example, lithium hydroxide (LiOH) or the like. The lithium compound may include, for example, lithium nitrate, lithium carbonate, and the like.

In the coating liquid, the molar ratio of Li to P "$n_{Li}/n_P$" may be, for example, 0.45 to 1.09. When the molar ratio "$n_{Li}/n_P$" is 0.45 to 1.09, the phosphate skeleton tends to be maintained in the coating liquid and in the coating film. When the coating film contains a phosphate skeleton, the battery resistance is expected to be reduced. The molar ratio "$n_{Li}/n_P$" may be, for example, 0.75 or more, or 1.05 or more, or 1.07 or more. The molar ratio "$n_{Li}/n_P$" may be, for example, 1.07 or less, or 1.05 or less, or 0.75 or less.

Solvent

The solvent may comprise any component so long as the solute dissolves. The solvent may include, for example, water, alcohol, and the like. The solvent may include, for example, ion-exchanged water, ethanol, and the like.

Manufacturing Method

FIG. 1 is a schematic flowchart of a manufacturing method according to the present embodiment. Hereinafter, the "manufacturing method in the present embodiment" may be abbreviated as "the present manufacturing method". The manufacturing method may include a "manufacturing method of composite particles" and a "manufacturing method of an all solid state battery". The manufacturing method of composite particles includes "(a) preparing a mixture" and "(b) producing a composite particle". A manufacturing method of an all solid state battery includes "(c) manufacturing a positive electrode" and "(d) manufacturing an all solid state battery".

Manufacturing Method of Composite Particles

Figure 2:
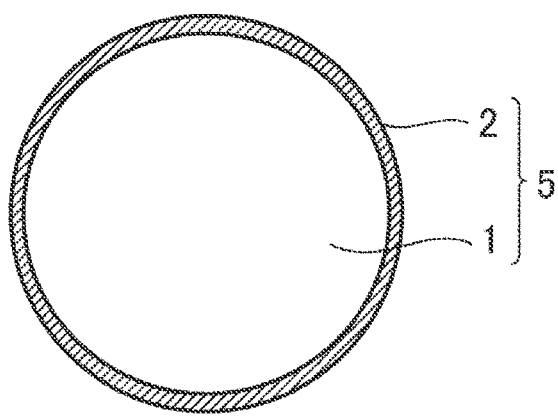
FIG. 2 is a conceptual diagram showing composite particles in the present embodiment.

FIG. 2 is a conceptual diagram showing composite particles in the present embodiment. In the present manufacturing method, composite particles 5 are produced. The composite particles 5 may be referred to as "coated positive electrode active material" or the like, for example. The composite particles 5 include positive electrode active material particles 1 and a coating film 2. The composite particles 5 may form, for example, aggregates.

(a) Preparation of Mixtures

The manufacturing method includes preparing a mixture by mixing a coating liquid and the positive electrode active material particles 1. Details of the coating liquid are as described above. The mixture may be, for example, a suspension or a wet flour. For example, the positive electrode active material particles 1 (powder) may be dispersed in the coating liquid to form a suspension. For example, a wet powder may be formed by spraying a coating liquid into the powder. Any mixing device, granulation device, or the like may be used in the present manufacturing method.

The positive electrode active material particles 1 are cores of the composite particles 5. The positive electrode active material particles 1 may be secondary particles (aggregates of primary particles). The positive electrode active material particles 1 (secondary particles) may have, for example, a D50 of 1 to 50 μm, a D50 of 1 to 20 μm, or a D50 of 5 to 15 μm. The primary particles may have a maximum Feret diameter of, for example, 0.1-3 μm.

The positive electrode active material particles 1 may include an optional component. The positive electrode active material particles 1 may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. For example, "(NiCoMn)" in "Li(NiCoMn)$O_2$" indicates that the sum of the compositional ratios in parentheses is 1. As long as the sum is 1, the amounts of the individual components are optional. $Li(NiCoMn)O_2$ may include, for example, $LiNi_{1/3}Co_{1/3}Mn_{1/3}O_2$, $LiNi_{0.5}Co_{0.2}Mn_{0.3}O_2$, $LiNi_{0.8}Co_{0.1}Mn_{0.1}O_2$. $Li(NiCoAl)O_2$ may include, for example, $LiNi_{0.8}Co_{0.15}Al_{0.05}O_2$.

The positive electrode active material particles 1 may have, for example, a chemical composition represented by the following formula (1) "$LiNi_xM1_{1-x}O_2$ (0.5≤x≤1, $M^1$ includes at least one selected from the group consisting of Co, Mn and Al". That is, the positive electrode active material particles 1 may include a high nickel material. High nickel materials tend to be weak to acids. The coating liquid in the present embodiment is suitable for a high nickel material. x is, for example, may be 0.6 or more, may be 0.7 or more, may be 0.8 or more, it may be 0.9 or more. As the compositional ratio (x) of Ni increases, the specific capacitance tends to increase. On the other hand, the acid resistance tends to decrease. As Ni composition-ratio (x) increases, the resistance-reducing effect of the coating liquid of the present embodiment is expected to increase.

(b) Production of Composite Particles

The manufacturing method comprises producing composite particles 5 by drying the mixture. The coating liquid adhering to the surface of the positive electrode active material particles 1 is dried to form the coating film 2. Any drying method may be used in the present manufacturing method. In the present manufacturing method, since the coating liquid has a pH of 2.5 or more, the corrosion of the positive electrode active material grains 1 can be reduced.

For example, the composite particles 5 may be formed by a spray drying method. That is, the liquid droplets are formed by spraying the suspension from the nozzle. The droplets include positive electrode active material particles 1 and a coating liquid. For example, the droplets may be dried by hot air to form the composite particles 5. The use of a spray-drying process is expected to improve the coverage, for example.

The solids fraction of the suspension for spray drying may be, for example, from 1 to 50% or from 10 to 30% by volume. The nozzle diameter may be, for example, a 0.1~10 mm or a 0.1~1 mm. The hot air temperature may be, for example, 100 to 200° C.

For example, the composite particles 5 may be produced by a rolling fluidized bed coating apparatus. In a rolling fluidized bed coating apparatus, "(a) preparation of a mixture" and "(b) production of composite particles" can be performed simultaneously.

As described above, the composite particles 5 can be produced. The coating film 2 contains a phosphorus compound. The coating film 2 may contain a phosphoric acid compound. Conventionally, niobium oxide ($LiNbO_3$, etc.) is also known as the coating film 2. The phosphorus compound tends to have superior durability under a high potential as compared with the niobium oxide.

The use of the coating liquid of the present embodiment is expected to improve the coverage. The composite particles 5 may be formed to have a coverage of, for example, 88% or more. When the coverage is 88% or more, a reduction in battery resistance is expected. Coverage, for example, may be 91% or more, may be 92% or more, may be 95% or more, it may be 100%. The coverage may be, for example, 100% or less, or 95% or less.

The coating film 2 may be formed to have a thickness of, for example, 5 to 100 nm, may be formed to have a 10~30 nm thickness, or may be formed to have a 20~30 nm thickness.

The manufacturing method may include subjecting the composite particles 5 to a heat treatment. The coating film 2 may be fixed by heat treatment. The heat treatment may also be referred to as "calcination". Any heat treatment apparatus may be used in the present manufacturing method. The heat treatment temperature may be, for example, 150 to 300° C. The heat treatment time may be, for example, 1 to 10 hours. For example, the heat treatment may be performed in air, or may be performed in an inert atmosphere.

Manufacturing Method of all Solid State Battery

Figure 3:
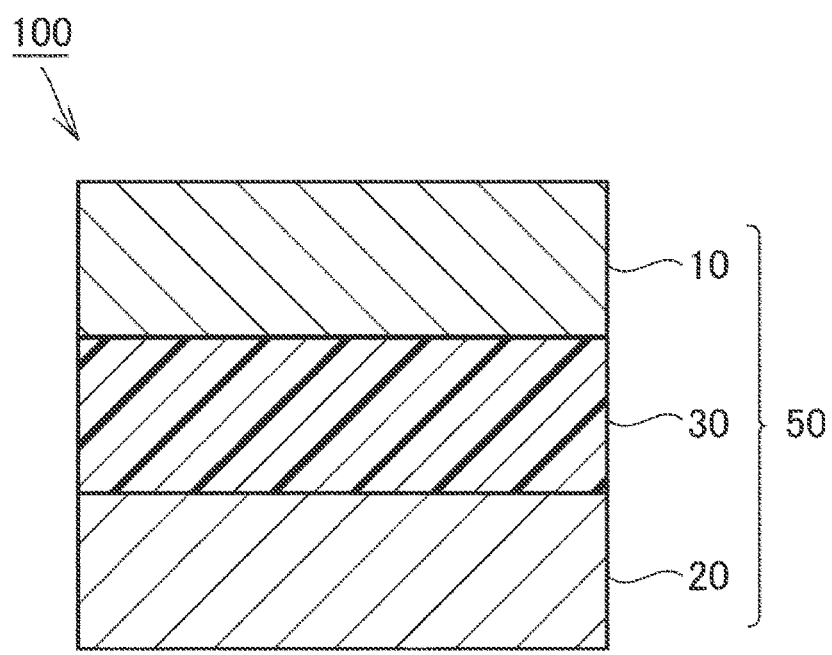
FIG. 3 is a conceptual diagram illustrating an all solid state battery according to the present embodiment.

FIG. 3 is a conceptual diagram illustrating an all solid state battery according to the present embodiment. In this manufacturing method, the all solid state battery 100 is manufactured. The all solid state battery 100 includes a power generation element 50. The power generation element 50 includes a positive electrode 10, a separator layer 30, and a negative electrode 20. The separator layer 30 is interposed between the positive electrode 10 and the negative electrode 20.

(c) Production of Positive Electrode

The manufacturing method includes manufacturing the positive electrode 10 including the composite particles 5 and the sulfide solid electrolyte. Details of the composite particles 5 are as described above.

For example, the slurry may be prepared by mixing the composite particles 5, the sulfide solid electrolyte, the conductive material, the binder, and the dispersion medium. The dispersion medium may include, for example, heptane, butyl butyrate, and the like. The slurry may be applied to the surface of the positive electrode current collector to form a positive electrode active material layer. The positive electrode active material layer may be compressed after drying. The positive electrode active material layer may be formed to have a thickness of, for example, 10 to 200 The positive electrode current collector may include, for example, an Al foil. The positive electrode current collector may have a thickness of, for example, 5 to 50 μm.

The sulfide solid electrolyte may form an ion conduction path in the positive electrode active material layer. The blending amount of the sulfide solid electrolyte may be, for example, 1 to 200 parts by volume, 50 to 150 parts by volume, or 50 to 100 parts by volume with respect to 100 parts by volume of the composite particles 5 (positive electrode active material). The sulfide solid electrolyte includes sulfur (S). The sulfide solid-electrolyte may include, for example, Li, P, and S. The sulfide solid-electrolyte may further contain, for example, oxygen (O), silicon (Si), or the like. The sulfide solid electrolyte may further contain, for example, a halogen. The sulfide solid-electrolyte may further contain, for example, iodine (I), bromine (Br), and the like. The sulfide solid electrolyte may be, for example, a glass-ceramic type or an argyrodite type. Sulfide solids electrolytes include, for example, LiI—LiBr—$Li_3PS_4$, $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$ it may comprise at least one selected from the group consisting of, and $Li_3PS_4$.

For example, "LiI—LiBr—$Li_3PS_4$" refers to a sulfide solid-state electrolyte produced by mixing LiI and LiBr with $Li_3PS_4$ in any molar ratio. For example, a sulfide solid electrolyte may be produced by a mechanochemical process. "$Li_2S$—$P_2S_5$" includes $Li_3PS_4$. $Li_3PS_4$ may be generated, for example, by mixing $Li_2S$ and $P_2S_5$ with "$Li_2S/P_2S_5$=75/25".

The conductive material may form an electron conduction path in the positive electrode active material layer. The blending amount of the conductive material may be, for example, 0.1 to 10 parts by mass with respect to 100 parts by mass of the composite particles 5 (positive electrode active material). The conductive material may include any component. The conductive material may include, for example, at least one selected from the group consisting of carbon black, vapor-grown carbon fiber (VGCF), carbon nanotube (CNT), and graphene flakes.

The binder may bond the solid material. The blending amount of the binder may be, for example, 0.1 to 10 parts by mass with respect to 100 parts by mass of the composite particles 5 (positive electrode active material). The binder may comprise any component. The binder may include, for example, at least one selected from the group consisting of polyvinylidene fluoride (PVdF), vinylidene fluoride-hexafluoropropylene copolymer (PVdF-HFP), styrene-butadiene rubber (SBR), and polytetrafluoroethylene (PTFE).

(d) Production of all Solid State Battery

The manufacturing method includes manufacturing an all solid state battery 100 including a positive electrode 10. For example, the negative electrode 20 and the separator layer 30 are prepared. For example, the positive electrode 10, the separator layer 30, and the negative electrode 20 may be stacked in this order to form a stacked body. The power generation element 50 can be formed by hot pressing the laminated body. A terminal or the like is connected to the power generation element 50. The all solid state battery 100 can be manufactured by enclosing the power generation element 50 in the outer casing. The exterior body may be, for example, a pouch made of a metal foil laminate film or the like. The all solid state battery 100 may be manufactured to include one power generation element 50 alone, or may be manufactured to include a plurality of power generation elements 50. The plurality of power generation elements 50 may form a series circuit or a parallel circuit.

For example, the slurry may be prepared by mixing the negative electrode active material particles, the sulfide solid electrolyte, the conductive material, the binder, and the dispersion medium. The dispersion medium may contain, for example, butyl butyrate. The negative electrode active material layer may be formed by applying the slurry to the surface of the negative electrode current collector. The negative electrode active material layer may be compressed after drying. The negative electrode active material layer may be formed to have a thickness of, for example, 10 to 200 μm. The negative electrode active material particles may include an optional component. The negative electrode active material particles may include, for example, at least one selected from the group consisting of graphite, Si, $SiO_x$ (0<x<2), and $Li_4Ti_5O_{12}$. The negative electrode current collector may include, for example, a copper (Cu) foil. The negative electrode current collector may have a thickness of, for example, 5 to 50 μm.

For example, a slurry may be prepared by mixing a sulfide solid electrolyte, a binder, and a dispersion medium. For example, the separator layer 30 may be formed by applying the slurry to the surface of the electrode (the positive electrode 10 or the negative electrode 20). For example, the separator layer 30 may be formed by applying a slurry to the surface of a temporary support (e.g., a metal foil). The separator layer 30 may be transferred from the temporary support to the surface of the electrode. The same kind of sulfide solid electrolyte may be used between the positive electrode 10, the separator layer 30, and the negative electrode 20, or a different kind of sulfide solid electrolyte may be used.

As described above, the all solid state battery 100 can be manufactured. The all solid state battery 100 is expected to have a low battery resistance.

Production of all Solid State Batteries

Coating liquids, composite-particles and all solid state batteries according to No. 1~14 were produced as follows. Hereinafter, for example, a "coating liquid related to No. 1" or the like may be abbreviated as "No. 1".

No. 1

10.8 g metaphosphoric acid (manufactured by Fujifilm Wako Pure Chemical Co., Ltd.) was dissolved in 166 g ion-exchanged water to produce a coating liquid. pH of the coating liquid was measured. The measured data are shown in Table 1 below.

NCM ($LiNi_{1/3}Co_{1/3}Mn_{1/3}O_2$) was prepared as the positive electrode active material grains. A suspension was prepared by dispersing the powder of the positive electrode active material particles in a coating liquid. A spray dryer "Mini Spray Dryer B-290" from BUCHI was prepared. The suspension was fed to a spray dryer to produce a powder of composite particles. The charge air temperature of the spray dryer was 200° C., and the charge air volume was 0.45 m³/min. The composite particles were heat treated in air. The heat treatment temperature was 200° C. The heat treatment time was 5 hours.

The following materials were prepared.
Sulfide solid-electrolyte: 10LiI-15LiBr-75$Li_3PS_4$
Conductive material: VGCF
Binder: SBR
Dispersion medium: Heptane
Positive electrode current collector: Al foil A slurry was prepared by mixing composite particles, a sulfide solid electrolyte, a conductive material, a binder, and a dispersion medium. The mixing ratio of the composite particle and the sulfide solid electrolyte was "composite particle/sulfide solid electrolyte=6/4 (volume ratio)". The blending amount of the conductive material was 3 parts by mass with respect to 100 parts by mass of the composite particles. The amount of the binder was 3 parts by mass with respect to 100 parts by mass of the composite particles. The slurry was thoroughly stirred by an ultrasonic homogenizer. A coating film was formed by coating the slurry on the surface of the positive electrode current collector. The coating was dried by hot plate at 100° C. for 30 minutes. As a result, a positive electrode original fabric was produced. A disk-shaped positive electrode was cut out from the positive electrode original material. The area of the positive electrode was 1 cm².

A negative electrode and a separator layer were prepared. The negative electrode active material particles were graphite. The same kind of sulfide solid electrolyte was used between the positive electrode, the separator layer and the negative electrode. In the cylindrical jig, the positive electrode, the separator layer, and the negative electrode were laminated to form a laminated body. By pressing the laminate, a power generation element was formed. An all solid state battery was manufactured by connecting a terminal to a power generation element.

No. 2

Phosphate solutions were formed by dissolving 10.8 g metaphosphate (manufactured by Fujifilm Wako Pure Chemical Industries, Ltd.) in 166 g ion-exchanged water. A coating liquid was prepared by dissolving lithium hydroxide monohydrate (LiOH H$_2$O) in the phosphoric acid solution so that the molar ratio "$n_{Li}/n_P$" was 0.45. pH of the coating liquid was measured. The measurement results are shown in Table 1 below. Thereafter, composite-particle and all solid state batteries were produced in the same manner as in No. 1.

No. 3~6

Coating liquids, composite particles, and all solid state batteries were produced in the same manner as in No. 2, except that the dissolution amounts of the lithium-hydroxide monohydrate were changed so that the molar ratios of "$n_{Li}/n_P$" in the tables 1 below were changed.

No. 7~10

A coating liquid was prepared in the same manner as in No. 2, except that the amount of lithium hydroxide monohydrate dissolved was changed so that the molar ratio "$n_{Li}/n_P$" in Table 1 below was obtained. In No. 7~10, a precipitate was formed in the coating liquid. Therefore, in No. 7~10, the composite-particle and all solid state batteries were not produced.

No. 11~13

Coating liquids, composite particles, and all solid state batteries were produced as in No. 1, 2, and 6, respectively, except that NCA (LiNi$_{0.8}$Co$_{0.15}$Al$_{0.05}$O$_2$) was used as the positive electrode active material particles.

Evaluation

Battery resistance was measured. The measurement results are shown in Table 1 below. In Tables 1 below, NCM indicates LiNi$_{1/3}$Mn$_{1/3}$O$_2$. In Tables 1 below, NCA indicates LiNi$_{0.8}$Co$_{0.15}$Al$_{0.05}$O$_2$. In Tables 1 below, the cell resistances of No. 1 to 6 are relative, where the cell resistances of No. 1 are 100. In Tables 1 below, the cell resistance of No. 11~13 is relative to the cell resistance of No. 11 as 100.

TABLE 1

| | Coating liquid | | | Composite particle | | |
|---|---|---|---|---|---|---|
| No. | ICP Molar fraction ($n_{Li}/n_p$) [—] | pH [—] | Precipitate None | Positive electrode material particles NCM | XPS Coverage rate [%] | Evaluation Battery resistance [—] |
| 1 | 0 | 1.7 | None | NCM | 83 | 100 |
| 2 | 0.45 | 2.5 | None | NCM | 88 | 88 |
| 3 | 0.75 | 6 | None | NCM | 89 | 88 |
| 4 | 1.05 | 8 | None | NCM | 91 | 94 |
| 5 | 1.07 | 8.6 | None | NCM | 91 | 94 |
| 6 | 1.09 | 10.7 | None | NCM | 92 | 88 |
| 7 | 1.14 | — | Y | — | — | — |
| 8 | 1.25 | — | Y | — | — | — |
| 9 | 1.29 | — | Y | — | — | — |
| 10 | 1.35 | — | Y | — | — | — |
| 11 | 0 | 1.7 | None | NCA | 88 | 100 |
| 12 | 0.45 | 2.5 | None | NCA | 95 | 77 |
| 13 | 1.09 | 10.7 | None | NCA | 80 | 69 |

Results

As shown in Tables 1 above, when pH of the coating liquid is 2.5 or more, the cell resistivity tends to decrease (No. 1 to 6). When pH of the coating liquid exceeds 10.7, a precipitate tends to be formed (No. 6~10).

When the positive electrode active material particles contain NCA (high nickel material), the reduction in the cell resistivity tends to be larger than when the positive electrode active material particles contain NCM (No. 1, 2, 6, 11 to 13).

The present embodiment and the present example are illustrative in all respects. The present embodiment and the present example are not restrictive. The technical scope of the present disclosure includes all changes within the meaning and range equivalent to the description of the claims. For example, from the beginning, it is planned to extract an appropriate configuration from the present embodiment and the present example and combine them as appropriate.

What is claimed is:

1. A coating liquid comprising:
   a solute; and
   a solvent,
   wherein:
   the solute includes a phosphoric acid compound and a lithium compound and has a pH of 2.5 to 10.7; and
   a molar ratio of lithium with respect to phosphorus is from 0.45 to 0.75.

2. The coating liquid according to claim 1, wherein the lithium compound includes lithium hydroxide.

3. The coating liquid according to claim 1, wherein the phosphoric acid compound includes at least one selected from a group consisting of metaphosphoric acid and polyphosphoric acid.

4. A manufacturing method of a composite particle, the manufacturing method comprising:
   (a) preparing a mixture by mixing the coating liquid according to claim 1 and a positive electrode active material particle; and
   (b) manufacturing the composite particle by drying the mixture.

5. The manufacturing method according to claim 4, wherein:
   the positive electrode active material particle has a chemical composition represented by the following equation (1) LiNi$_x$M$^1_{1-x}$O$_2$ . . . (1); and in the above equation (1), $M_1$ includes at least one selected from a group consisting of Co, Mn, and Al, and x satisfies a relation of $0.5 \leq x \leq 1$.

6. A manufacturing method of an all solid state battery, the manufacturing method comprising:
(c) manufacturing a positive electrode including a composite particle manufactured by the manufacturing method according to claim 4, and a sulfide solid electrolyte; and
(d) manufacturing the all solid state battery including the positive electrode.

* * * * *